(12) United States Patent (10) Patent No.: US 7,614,046 B2
Daniels et al. (45) Date of Patent: Nov. 3, 2009

(54) METHOD AND SYSTEM FOR ANALYZING THE IMPACT OF A SOFTWARE UPDATE

(75) Inventors: Bradford Ruffin Daniels, Redmond, WA (US); John Dunagan, Bellevue, WA (US); Roussi A. Roussev, Melbourne, FL (US); Chad E. Verbowski, Redmond, WA (US); Yi-Min Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 10/997,685

(22) Filed: Nov. 24, 2004

(65) Prior Publication Data

US 2006/0117310 A1 Jun. 1, 2006

(51) Int. Cl.
*G06F 9/44* (2006.01)
(52) U.S. Cl. .................. 717/170; 717/168; 717/171; 717/127; 717/128; 717/131
(58) Field of Classification Search .............. 717/168, 717/169, 170, 128
See application file for complete search history.

(56) References Cited

U.S. PATENT DOCUMENTS

| | | | | |
|---|---|---|---|---|
| 6,009,274 | A * | 12/1999 | Fletcher et al. | 717/173 |
| 7,376,945 | B1 * | 5/2008 | Kakumani et al. | 717/171 |
| 7,386,839 | B1 * | 6/2008 | Golender et al. | 717/131 |
| 2003/0110253 | A1 * | 6/2003 | Anuszczyk et al. | 709/224 |
| 2004/0260678 | A1 | 12/2004 | Verbowski et al. | |
| 2005/0155031 | A1 | 7/2005 | Wang et al. | |
| 2005/0188268 | A1 | 8/2005 | Verbowski et al. | |

OTHER PUBLICATIONS

U.S. Appl. No. 10/918,086, filed Aug. 13, 2004, Yuan et al.
"Web-to-Host: Reducing the Total Cost of Ownership," The Tolly Group, Total Cost of Ownership White Paper, May 2000 (13 pages).
Reiter, Michael K. and Aviel D. Rubin, "Crowds: Anonymity for Web Transactions," ACM Transactions on Information and System Security, vol. 1, No. 1, Nov. 1998, ACM 1998 (pp. 66-92).
Liblit, Ben, Alex Aiken, Alice X. Zheng and Michael I. Jordan, "Bug Isolation via Remote Program Sampling," PLDI'03, Jun. 9-11, 2003, ACM (pp. 141-154).
Osterlund, Robert, "PIKT: Problem Informant/Killer Tool," Proceedings of the 14th Systems Administration Conference, Dec. 3-8, 2000, USENIX 2000, pp. 147-165.
"Change Auditing Solution," Tripwire, Inc., Copyright Tripwire, Inc., 2005 (1 page) http://www.tripwire.com/ [Accessed Oct. 3, 2005].

(Continued)

*Primary Examiner*—Lewis A Bullock, Jr.
*Assistant Examiner*—Paul Mills
(74) *Attorney, Agent, or Firm*—Perkins Coie LLP

(57) ABSTRACT

A method and system for analyzing the impact on software of an update to a software system is provided. The impact analysis system identifies resources that are affected by an update to the software system and identifies resources that are accessed by various software components during execution of the software components. To analyze the effects of an update, the impact analysis system identifies those accessed resources of the software components that are affected by the update as being impacted resources. The impact analysis system considers those software components that access the impacted resources to be impacted software components. The impact analysis system provides a user interface through which a user can view and analyze the impact of an update.

18 Claims, 7 Drawing Sheets

OTHER PUBLICATIONS

Chaum, David, "Untraceable Electronic Mail, Return Addresses, and Digital Pseudonyms," Communications of the ACM, Feb. 1981, vol. 24, No. 2, ACM 1981 (8 pages).

Forrest, Stephanie, Steven A. Hofmeyr, Anil Somayaji and Thomas A. Longstaff, "A Sense of Self for Unix Processes," Proceedings of the 1996 Symposium on Security and Privacy, IEEE Computer Society Press, 1996 (9 pages).

Chen, Mike Y., Emre Kiciman, Eugene Fratkin, Armando Fox and Eric Brewer, "Pinpoint: Problem Determination in Large, Dynamic Internet Services," In Proceedings of International Conference on Dependable Systems and Networks 2002, 10 pages.

Benaloh, Josh Daniel Cohen, "Verifiable Secret-Ballot Elections," Dissertation, Yale University, Dec. 1996, Josh Daniel Cohen Benaloh 1988, 132 pages.

Handley, Mark, Vern Paxson and Christian Kreibich, "Network Intrusion Detection: Evasion, Traffic Normalization, and End-to-End Protocol Semantics," Presentation at USENIX Security 2002, 31 pages.

Burgess, Mark, "A Site Configuration Engine," In Computer Systems 1995, pp. 1-29.

Traugott, Steve and Joel Huddleston, "Bootstrapping an Infrastructure," Proceedings of the 12th Systems Administration Conference, LISA Dec. 1998, USENIX, pp. 181-196.

Clarke, Ian, Oskar Sandberg, Brandon Wiley and Theodore W. Hong, "Freenet: A Distributed Anonymous Information Storage and Retrieval System," Lecture Notes in Computer Science, Springer-Verlag GmbH, ISSN: 0302-9743, vol. 2009 / 2001, p. 46, online date Jun. 2003, 21 pages.

Ensel, Christian and Keller, Alexander, "An Approach for Managing Service Dependencies with XML and the Resource Description Framework," IBM Research Report, RC 22307 Jan. 15, 2002, Computer Science, IBM Research Division (pp. 1-17).

Wang, Yi-Min, Chad Verbowski and Daniel R. Simon, "Persistent-state Checkpoint Comparison for Troubleshooting Configuration Failures," Microsoft Technical Report MSR-TR-2003-28, Microsoft Research, Microsoft Corporation, Apr. 4, 2003, IEEE 2003, 7 pages.

Wang, Yi-Min, Chad Verbowski, John Dunagan, Yu Chen, Helen J. Wang, Chun Yuan and Zheng Zhang, "Strider: A Black-box, State-based Approach to Change and Configuration Management and Support," Proceedings of the 17th Large Installation Systems Administration Conference, Oct. 26-31, 2003, USENIX 2003 (pp. 159-171).

Goldschlag, David, Michael Reed and Paul Syverson, "Onion Routing for Anonymous and Private Internet Connections," CACM Feb. 1999 (5 pages).

Apap, Frank, Andrew Honig, Shlomo Hershkop, Eleazar Eskin and Sal Stolfo, "Detecting Malicious Software by Monitoring Anomalous Windows Registry Accesses," Proceedings of LISA 1999 (pp. 1-13).

Kremenek, Ted and Dawson Engler, "Z-Ranking: Using Statistical Analysis to Counter the Impact of Static Analysis Approximations," Proceedings of the 10th Annual International Static Analysis Symposium Jun. 2003 (21 pages).

Wang, Helen J., Chun Yuan, Yih-Chun Hu, Zheng Zhang and Yi-min Wang, "Friends Troubleshooting Network, Towards Privacy-Preserving, Automatic Troubleshooting," Microsoft Research Paper MSR-TR-2003-81, Microsoft Research, Nov. 2003 (6 pages).

KaZaa, http://www.kazaa.com, Copyright Sharman Networks 2002-2005, 1 page.

Engler, Dawson, David Yu Chen, Seth Hallem, Andy Chou and Benjamin Chelf, "Bugs as Deviant Behavior: A General Approach to Inferring Errors in Systems Code," Proceedings of ACM Symposium on Operating Systems Principles, Oct. 2001 (23 pages).

Aguilera, Marcos K., Jeffrey C. Mogul, Janet L. Wiener, Patrick Reynolds and Athicha Muthitacharoen, "Performance Debugging for Distributed Systems of Black Boxes," SOSP'03, Oct. 19-22, 2003, ACM 2003 (16 pages).

"Desktop and Notebook TCO Updated for the 21st Century," Sep. 12, 2003, Gartner Teleconference http://www.dataquest.com/teleconferences/asset_47431.jsp.

Przydatek, Bartosz, Dawn Song and Adrian Perrig, "SIA: Secure Information Aggregation in Sensor Networks," SenSys Nov. 2003, ACM 2003 (pp. 255-265).

Larsson, Magnus and Ivica Crnkovic, "Configuration Management for Component-based Systems," in Proceedings of International Conference on Software Engineering May 2001 (5 pages).

Couch, Dr. Alva L. And Michael Gilfix, "It's Elementary, Dear Watson: Applying Logic Programming To Convergent System Management Processes," In proceedings of LISA XIII 1999, Nov. 7-12, 1999 (pp. 121-135).

Freedman, Michael J., Emil Sit, Josh Cates and Robert Morris, "Introducing Tarzan, a Peer-to-Peer Anonymizing Network Layer," IPTPS 2002 (6 pages).

Wang, Helen J., John Platt, Yu Chen, Ruyun Zhang and Yi-Min Wang, "PeerPressure: A Statistical Method for Automatic Misconfiguration Troubleshooting," Microsoft Research Technical Report MSR-TR-2003-80, Microsoft Corporation, Nov. 2003 (13 pages).

Paxson, Vern, "Bro: A System for Detecting Network Intruders in Real-Time," Computer Networks, 31 (23-24), Dec. 14, 1999 (pp. 1-22).

Fujioka, Atsushi, Tatsuaki Okamoto and Kazuo Ohta, "A Practical Secret Voting Scheme for Large Scale Elections," Advances in Cryptology AUSCRYPT '92, Dec. 13-16, 1992 Proceedings, Springer-Verlag 1993 (pp. 244-251).

Solomon, David A. and Mark E. Russinovich, "Chapter 5—Management Mechanisms," Inside Microsoft Windows 2000, Third Edition, Microsoft Press, David A. Solomon and Mark E. Russinovich 2000 (75 pages).

Redstone, Joshua A., Michael M. Swift and Brian N. Bershad, "Using Computers to Diagnose Computer Problems," Proceedings of the HotOS IX: The 9th Workshop on Hot Topics in Operating Systems, May 18-21, 2003, USENIX 2003 (pp. 91-96).

* cited by examiner

METHOD AND SYSTEM FOR ANALYZING THE IMPACT OF A SOFTWARE UPDATE

TECHNICAL FIELD

The described technology relates generally to updating a software system and particularly to analyzing the impact of updating the software system on software resources.

BACKGROUND

Software systems, such as operating systems, utility programs, and application programs can be very complex systems that have many interdependent components (e.g., modules, drivers, and libraries) that access various resources (e.g., configuration files). From time to time, these software systems may need to be updated by updating or upgrading the existing software systems or installing new software systems. For example, a software system may need to be patched to fix a bug or upgraded to add enhanced capabilities. Because of the complexities of the software systems, it can be very difficult to assess the full impact of an update. For example, a dynamic link library may be shared by many components of a software system and by many different software systems. The library may be updated to include a new feature that is needed by one software system. Such an update may, however, cause the other software systems to malfunction.

In many situations, it is important to update software systems as soon as the need for the update arises. For example, although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of software systems including application programs or other computer programs executing on those computer systems. Developers of software systems and administrators of computer systems of an enterprise go to great effort and expense to identify and remove vulnerabilities. Because of the complexity of software systems, however, it is virtually impossible to identify and remove all vulnerabilities before software systems are released. After a software system is released, developers can become aware of vulnerabilities in various ways. A party with no malicious intent may identify a vulnerability and may secretly notify the developer so the vulnerability can be removed before a hacker identifies and exploits it. If a hacker identifies a vulnerability first, the developer may not learn of the vulnerability until it is exploited—sometimes with disastrous consequences. In either case, it is important to remove the vulnerability as soon as possible by updating the software system.

Regardless of how a developer finds out about a need for an update, the developer typically develops and distributes to system administrators "patches" or updates to the software system that addresses the need. If the need is not urgent (e.g., the vulnerability is not yet known to hackers), then a developer can design, implement, test, and distribute a patch in a disciplined way. If the need is urgent, then the developer may rush to distribute a patch without the same care that is used under normal circumstances. When patches are distributed to the administrators of the computer systems, they are responsible for scheduling and installing the patches.

Unfortunately, system administrators often delay the installation of patches for various reasons. When a patch is installed, the software system, and possibly the computer system on which it is executing, may need to be shut down and restarted or brought offline. If the software system is critical to the success of an organization, then the system administrator needs to analyze the tradeoffs of keeping the software system up and running with its associated risk of not installing the patch (e.g., being attacked by a hacker) and of shutting down a critical resource of the enterprise to install the patch. Some system administrators may delay the installation of the patch because they fear that, because of a hasty distribution, it might not be properly tested and could have unintended side effects such as with the software system itself that. was patched or causing a negative impact on other software systems or overall system performance and reliability. If the patch has an unintended side effect, then the software system, the computer system, or some other software component that is impacted by the patch may malfunction. In such a case, it may be very difficult and costly for a system administrator to undo the patch. Thus, these system administrators may delay installing a patch until experience by others indicates that there are no serious unintended side effects.

If a patch is to be installed, a system administrator would like to know all the software resources (e.g., applications, dynamic link libraries, and configuration information) that are affected by the patch and how they are affected. This knowledge would help the system administrator assess the full impact of the patch. Similarly, the developer of the patch would like to know all the software resources that are accessed by the software components of an enterprise. This knowledge would help the developer test the patch before it is distributed. Both system administrators and developers, however, would like to keep such information confidential. Developers are concerned that if information describing software affected by a patch (e.g., the source code) were to fall into the hands of a hacker, the hacker may be able to use the information to identify vulnerabilities and exploit them in systems that have not yet been patched. Developers may also be concerned that divulging these details may provide other parties a competitive advantage. Similarly, system administrators want to keep knowledge of their internal software systems confidential from competitors and potential hackers. To help with the analysis, system administrators could instrument their code (e.g., binaries or source code) to test a patch. Although the instrumenting of code can provide a very detailed analysis of interdependencies of software components, the instrumenting and analyzing of the results can be tedious and costly. In addition, the instrumenting of code can result in unintended side effects that may present new problems or obscure problems resulting from the patch.

It would be desirable to have a technique that would allow a system administrator to efficiently and effectively evaluate the effects of a patch while minimizing the disclosure of confidential information and without relying on instrumenting code.

SUMMARY

A method and system for analyzing the impact on software of an update to a software system is provided. The impact analysis system identifies resources that are affected by the update to the software system and resources that are accessed by various software components during execution of the software components. To analyze the effects of an update, the impact analysis system identifies those accessed resources of the software components that are affected by the update as being impacted resources. The impact analysis system considers those software components that access the impacted resources to be impacted software components. The impact analysis system provides a user interface through which a user can view and analyze the impact of the update.

DETAILED DESCRIPTION

Figure 1:
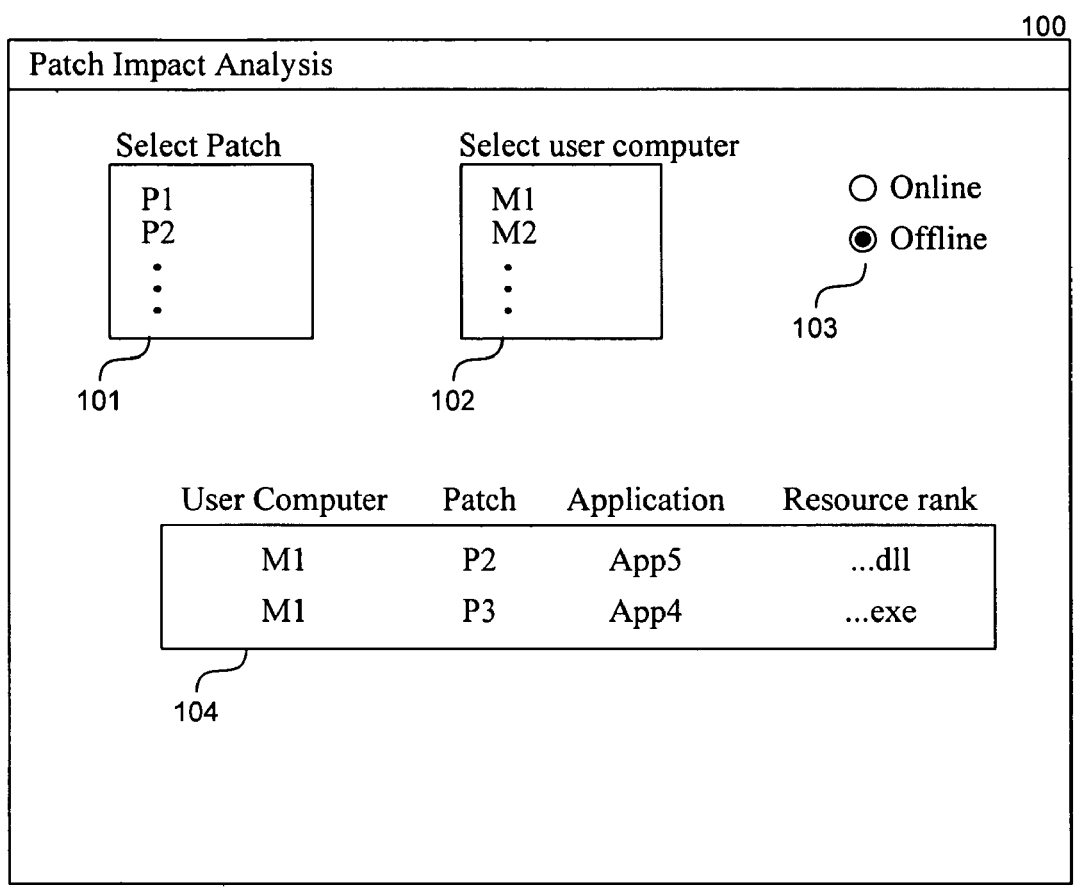
FIG. 1 is a display page that illustrates a user interface provided by the impact analysis system in one embodiment.

A method and system for analyzing the impact on software of updates to software systems is provided. In one embodiment, the impact analysis system identifies resources that are affected by an update to the software system. For example, when the software system is an operating system that is to be patched, the affected resources may include configuration information, executable code (e.g., in a dynamic link library), text files, and so on. The identification of the affected resources may be provided by the developer of the update. The developer of the update may have implicit knowledge of the affected resources and a system administrator may also use various techniques to identify the affected resources such as manually listing the affected resources, tracking the installation of the update, analyzing a change log generated during the installation of the update, and so on. The impact analysis system also identifies resources that are accessed by various software components during execution of the software components. For example, a software component may be a certain application that accesses various configuration parameters set by the operating system and dynamically loads various software modules (e.g., dynamic link libraries) provided by the operating system. The impact analysis system may have a sub-system that is launched whenever a user computer is started and that intercepts (e.g., by hooking the operating system) and logs all accesses to resources (that could possibly be affected by an update) by software components executing on that user computer. To analyze the effects of an update, the impact analysis system identifies those accessed resources of the software components that are affected by the update as being "impacted resources." The impact analysis system considers those software components that access the impacted resources to be "impacted software components." Because the impact analysis system automatically identifies resources and software components impacted by an update, a system administrator can use the information to analyze the potential effects of installing an update without having to divulge confidential information and without instrumenting code.

In one embodiment, the impact analysis system may support the automatic installation of updates that do not impact critical resources or critical software components. A system administrator, who may be administering many user computers of an enterprise, may designate resources or software components that are critical to the operation of the enterprise. For example, a transaction processing application may be critical to the operation of a bank, whereas a report generator may not be critical to the operation. In such a case, the system administrator may designate the transaction processing application as critical and each resource accessed by the application as critical. The system administrator may authorize the automatic installation of any update that does not impact the transaction processing application or any of its accessed resources. This automatic installation helps ensure that updates that are unlikely to have a critical impact on an enterprise can be quickly installed so that their benefits can be quickly realized even if they ultimately turn out to be defective.

In one embodiment, the impact analysis system provides various statistics that can help a system administrator analyze the impact of an update. When generating the statistics, the impact analysis system may analyze log files indicating accesses to resources by software components. For example, the impact analysis system may calculate the total execution time of each software component that accesses a resource that is affected by an update. A system administrator may want to focus their analysis and testing on those software components with the largest total execution time, greatest number of launches, greatest number of input/output events, and so on. A system administrator may also want to focus their analysis or resources by a frequency of access by a software component under the assumption that more frequently accessed resources are more important. In addition, the impact analysis system may provide raw data from the log files so that a system administrator can use other tools, such as a spreadsheet, to generate additional statistics that the system administrator deems appropriate.

In one embodiment, the impact analysis system provides for post-installation analysis of an update. The impact analysis system may use the log files to identify affected resources of the update that have been accessed by the executing software components since the installation. A developer may use the information of the log files to determine the extent to which the software components have effectively tested the update based on the extent to which the affected resources have been accessed by the software components. The impact analysis system may also determine whether the software components are using the updated resources, rather than out-of-date resources. For example, a software component that has been executing continuously since before the installation, may be using an out-of-date version of a dynamic link library. As another example, a software component that is launched after the installation of an update may load a private copy of a dynamic link library, rather than the updated version of the dynamic link library. The impact analysis system may request the operating system to provide information that it can use to identify the resources, such as dynamic link libraries, that are currently being used by an executing software component. The impact analysis system may compare those currently used resources to the resources provided by the developer, or to the resources listed in the change log that was generated when the update was installed. A change log is typically automatically generated when the update is installed so that the update can be uninstalled if necessary. The impact analysis system may compare various attributes (e.g., creation date, file size, cyclic redundancy check) of the resources currently being used by software components and the affected resources to determine whether the software components are using the most up-to-date versions.

FIG. 1 is a display page that illustrates a user interface provided by the impact analysis system in one embodiment. Display page 100 includes a patch selection box 101, a user computer selection box 102, online/offline radio buttons 103, and an impacted resources display area 104. A user may select to analyze the impact of one or more patches by selecting patches displayed in the patch selection box. The user may also select to analyze the impact of those patches on user computers as indicated by the user computer selection box. The user may select to analyze the impact of the patch based on online information or offline information. Offline information refers to information of the log files that is generated whenever software components access resources. Thus, the offline information represents a historical view of the resource access patterns of the software components. The online information refers to the resources that are currently being used by a software component and thus represent a snapshot view of the resources accessed by the software component. A system administrator may decide not to incur the overhead of collecting the offline information and rely on online information that is collected when an update is ready to be installed. Since the online information has less information content than the offline information, the system administrator may incur the overhead when the system administrator believes the additional information may be a significant help to the analysis. The impacted resources display area identifies, for each selected user computer and patch, the applications and resources that are impacted by the patch. The impacted resources display area may also rank the impact of the update on certain resources or software components so that a system administrator may focus their analysis on the highly ranked resources and software components.

The computing device on which the impact analysis system is implemented may include a central processing unit, memory, input devices (e.g., keyboard and pointing devices), output devices (e.g., display devices), and storage devices (e.g., disk drives). The memory and storage devices are computer-readable media that may contain instructions that implement the impact analysis system. In addition, data structures and message structures may be stored or transmitted via a data transmission medium, such as a signal on a communications link. Various communications links may be used, such as the Internet, a local area network, a wide area network, or a point-to-point dial-up connection.

The impact analysis system may be implemented in various operating environments including personal computers, server computers, hand-held or laptop devices, routers, switches, multiprocessor systems, microprocessor-based systems, programmable consumer electronics, network PCs, minicomputers, mainframe computers, distributed computing environments that include any of the above systems or devices, and the like.

The impact analysis system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The term "application" refers to any type of executing software such as drivers, kernel-mode code, operating systems, system utilities, web servers, database servers, and so on.

Figure 2:
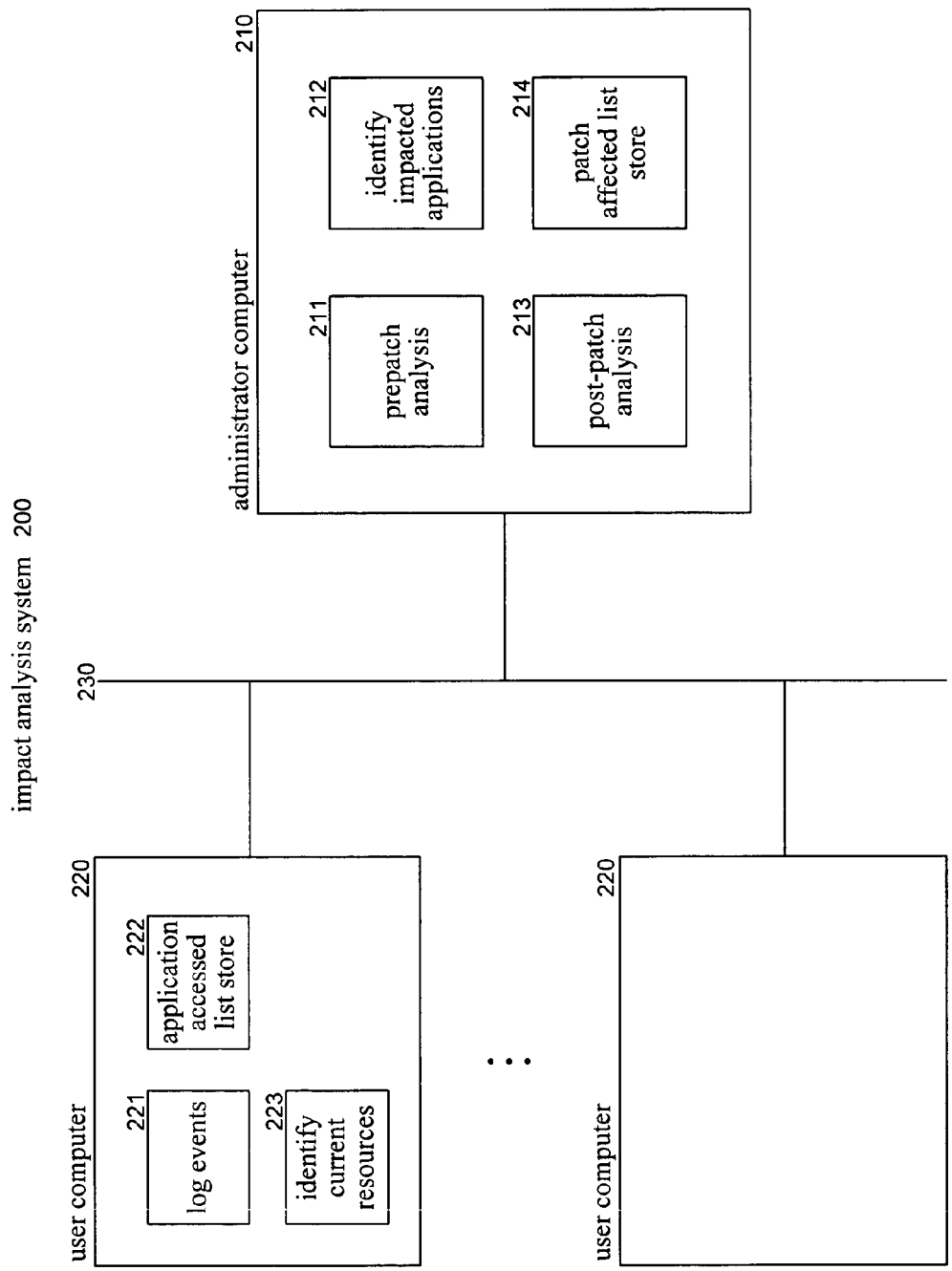
FIG. 2 is a block diagram that illustrates components of the impact analysis system in one embodiment.

FIG. 2 is a block diagram that illustrates components of the impact analysis system in one embodiment. The impact analysis system 200 may execute on an administrator computer 210 of an enterprise that is connected to various user computers 220 of the enterprise via a communication link 230. The impact analysis system may include an administrator-side sub-system and a user-side sub-system. The administrator-side sub-system may include a pre-patch analysis component 211, an identify impacted applications component 212, a post-patch analysis component 213, and a patch affected list store 214. The pre-patch analysis component receives from a developer (or generates by tracing the setup of the patch) a list of the impacted resources of an update (referred to as a "patch manifest") and receives from the user computers a list of the accessed resources of an application (referred to as an "application manifest"). Alternatively, a global application manifest may be generated and shared by multiple user computers. The pre-patch analysis component invokes the identify impacted applications component to identify the applications impacted by the update. The identify impacted applications component compares the patch manifest to the application manifest to identify the resources and applications impacted by the patch. The identify impacted applications component may then provide a user interface for a system administrator to review and analyze the impact of the patch. The post-patch analysis component identifies the resources currently used by an executing application and compares those resources to the impacted resources provided by the developer, or to the impacted resources as indicated by the change log generated when the patch was installed. The post-patch analysis component identifies when an application is using an out-of-date version of an updated resource, and provides usage information on each updated resource.

The user-side sub-system includes a log events component 221, an application accessed list store (or log file) 222, and an identify current resources component 223. The log events component may be launched whenever a user computer is started. The log events component intercepts events such as file accesses, registry accesses, interprocess communication usage, remote procedure calls, and so on. The log events component stores information describing each event in the application accessed list store. Each entry of the application accessed list store may identify the application, the resource accessed, and the type of access. The log events component may also log events indicating when an application starts and stops, when an application loads and unloads dynamic link libraries, and so on. The identify current resources component identifies those resources that are currently being used by an executing application. The identify current resources component provides a snapshot view of the accessed resources. For example, the snapshot view may identify files currently loaded by the application, but may not identify registry entries recently read by the application.

Figure 3:
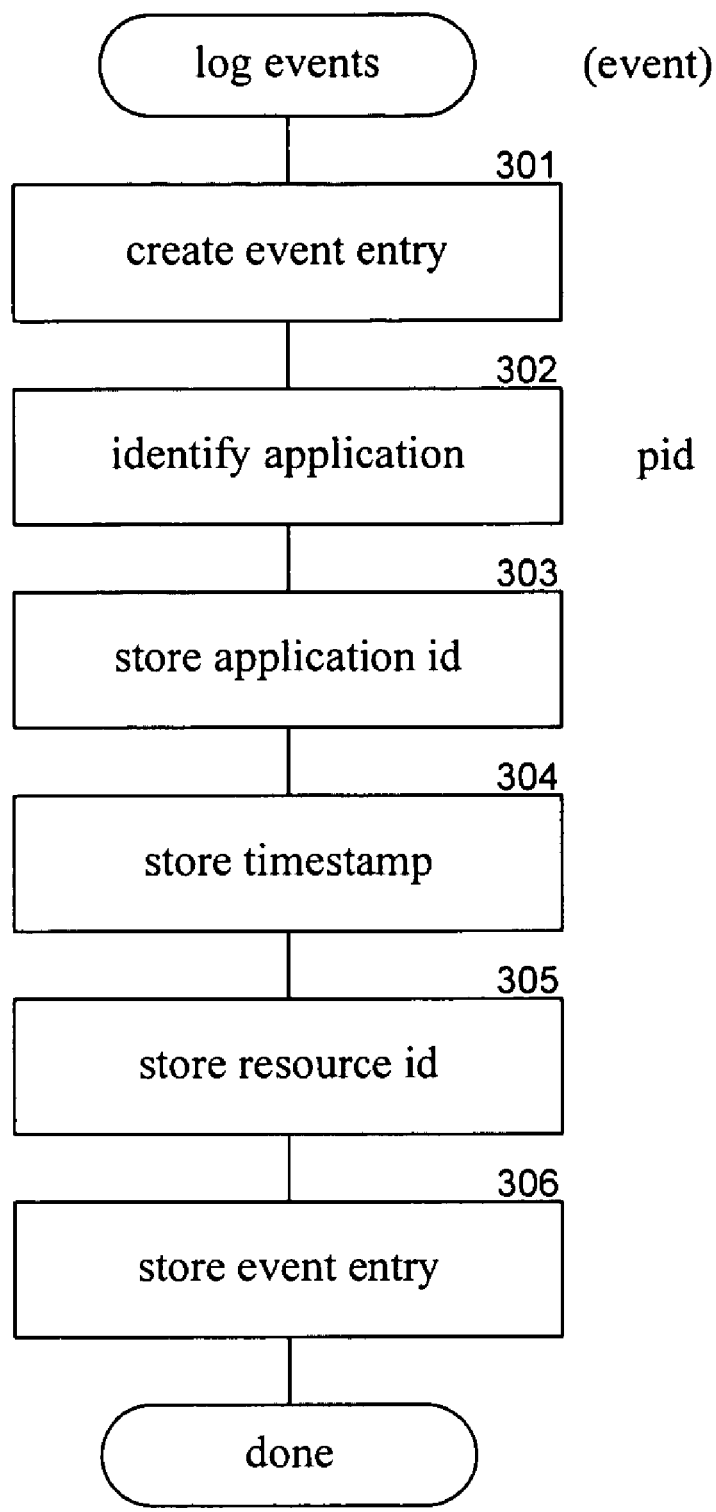
FIG. 3 is a flow diagram that illustrates the processing of the log events component in one embodiment.

FIG. 3 is a flow diagram that illustrates the processing of the log events component in one embodiment. The component may be invoked whenever a resource that could possibly be affected by an update is accessed. The component is passed an event, such as a registry entry access or a file access, and stores a corresponding entry in the application accessed list store. Each user computer may have an executing log events component. In block 301, the component creates an event entry for the event. In block 302, the component identifies the application that is accessing the resource, for example, based on a process identifier associated with the event. In block 303, the component stores an indication of the application in the event entry. In block 304, the component stores a timestamp in the event entry. In block 305, the component stores an indication of the accessed resource in the event entry. In block 306, the component stores the event entry in the application accessed list store and then completes.

Figure 4:
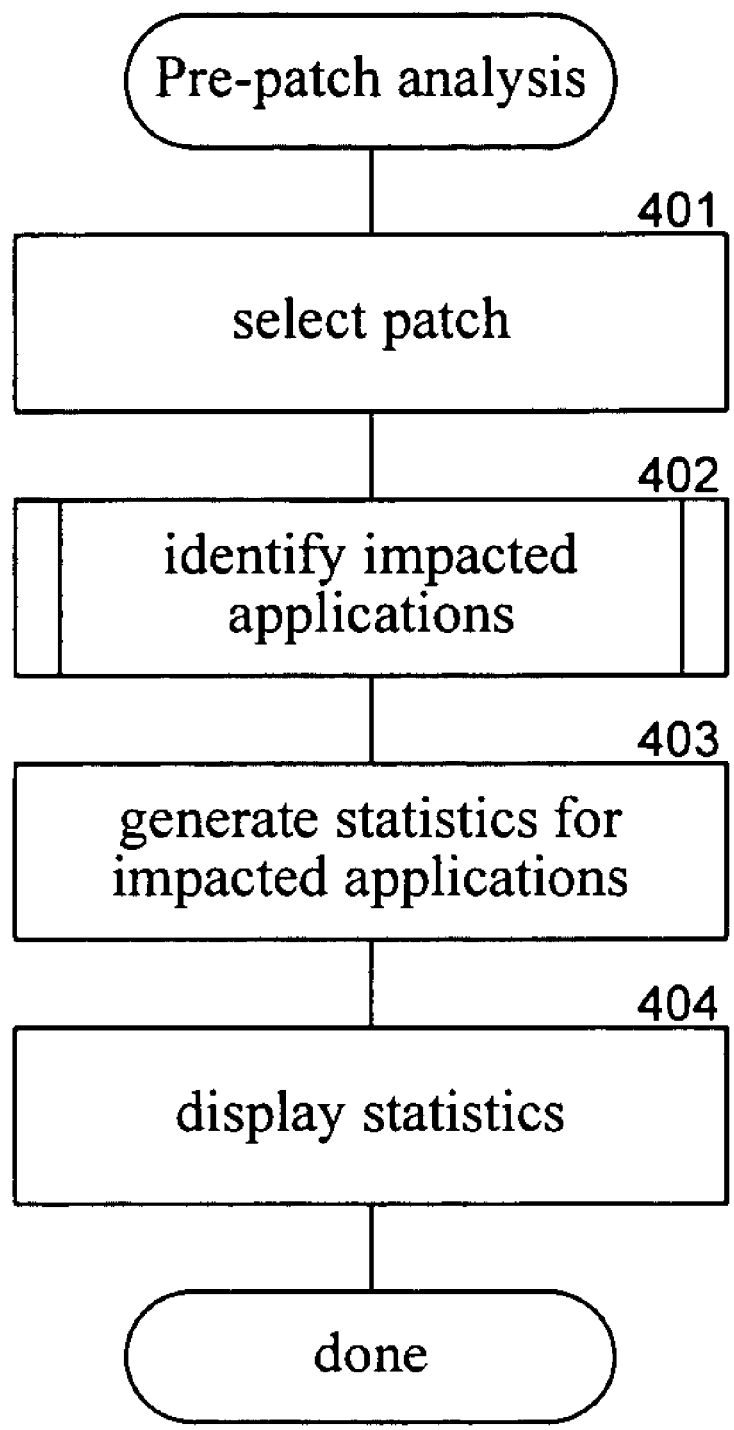
FIG. 4 is a flow diagram that illustrates the processing of the pre-patch analysis component in one embodiment.

FIG. 4 is a flow diagram that illustrates the processing of the pre-patch analysis component in one embodiment. The component provides a system administrator with data to assist in the analysis of the impact of a patch installation. In block 401, the component receives the selection of a patch from the system administrator. In block 402, the component invokes the identify impacted applications component to identify the applications that are impacted by the selected patch. In block 403, the component generates statistics for the impacted applications. In block 404, the component displays the generated statistics and then completes.

Figure 5:
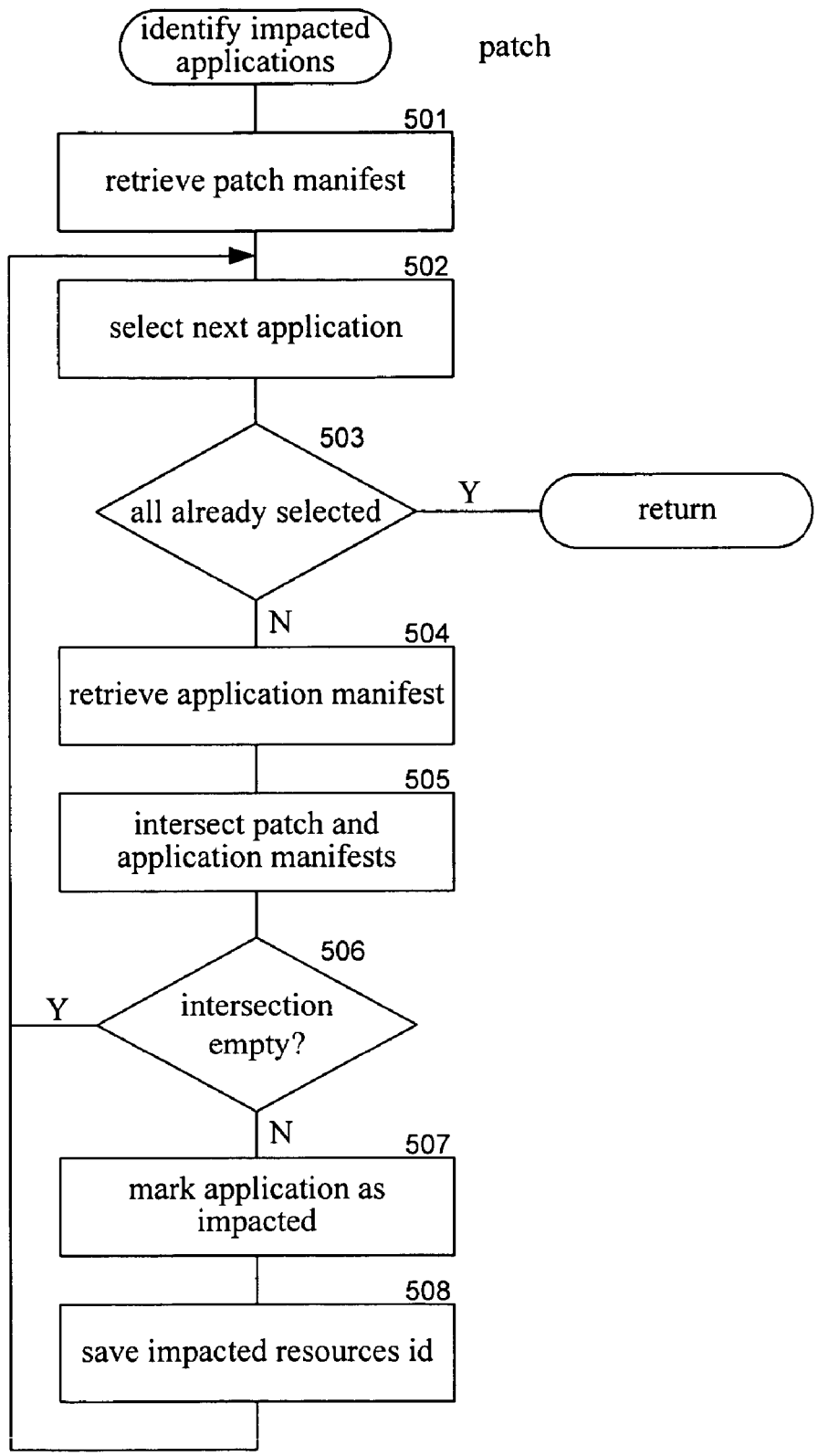
FIG. 5 is a flow diagram that illustrates the processing of the identify impacted applications component in one embodiment.

FIG. 5 is a flow diagram that illustrates the processing of the identify impacted applications component in one embodiment. The component is passed a patch and identifies the applications and/or resources that are impacted by the patch. In block 501, the component retrieves the list of the affected resources of the patch. In blocks 502-508, the component loops selecting each application and comparing its accessed resources to the affected resources of the patch. In block 502, the component selects the next application. In decision block 503, if all the applications have already been selected, then the component returns, else the component continues at block 504. In block 504, the component retrieves the list of the accessed resources of the selected application. This list may be generated from the log files. In block 505, the component determines the intersection of the accessed resources and affected resources, giving the impacted resources. In decision block 506, if there are no impacted resources, then the component loops to block 502 to select the next application, else the component continues at block 507. In block 507, the component marks the application as impacted along with the impacted resources. In block 508, the component saves an indication of the impacted resources and then loops to block 502 to select the next application.

Figure 6:
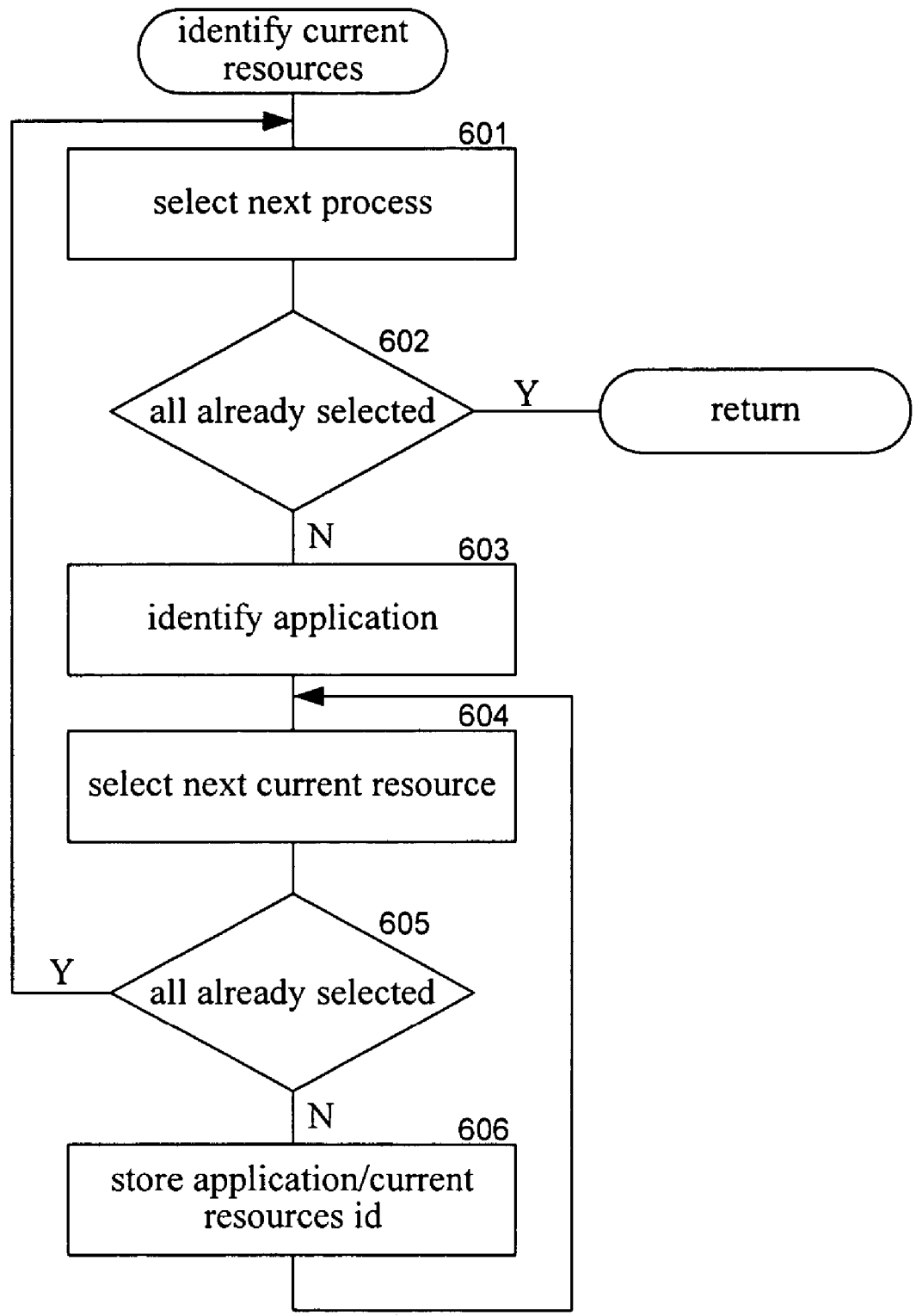
FIG. 6 is a flow diagram that illustrates the processing of the identify current resources component in one embodiment.

FIG. 6 is a flow diagram that illustrates the processing of the identify current resources component in one embodiment. The component generates online information of resources currently being used by an executing application. In block 601, the component selects the next process that is currently executing on the user computer. In decision block 602, if all the processes have already been selected, then the component returns, else the component continues at block 603. In block 603, the component identifies the application based on the process identifier. In blocks 604-606, the component loops identifying the currently used resources. In block 604, the component selects the next current resource of the selected process. In decision block 605, if all the currently used resources have already been selected, then the component loops to block 601 to select the next process, else the component continues at block 606. In block 606, the component stores an indication that the identified application is using the selected resource and then loops to block 604 to select the next resource.

Figure 7:
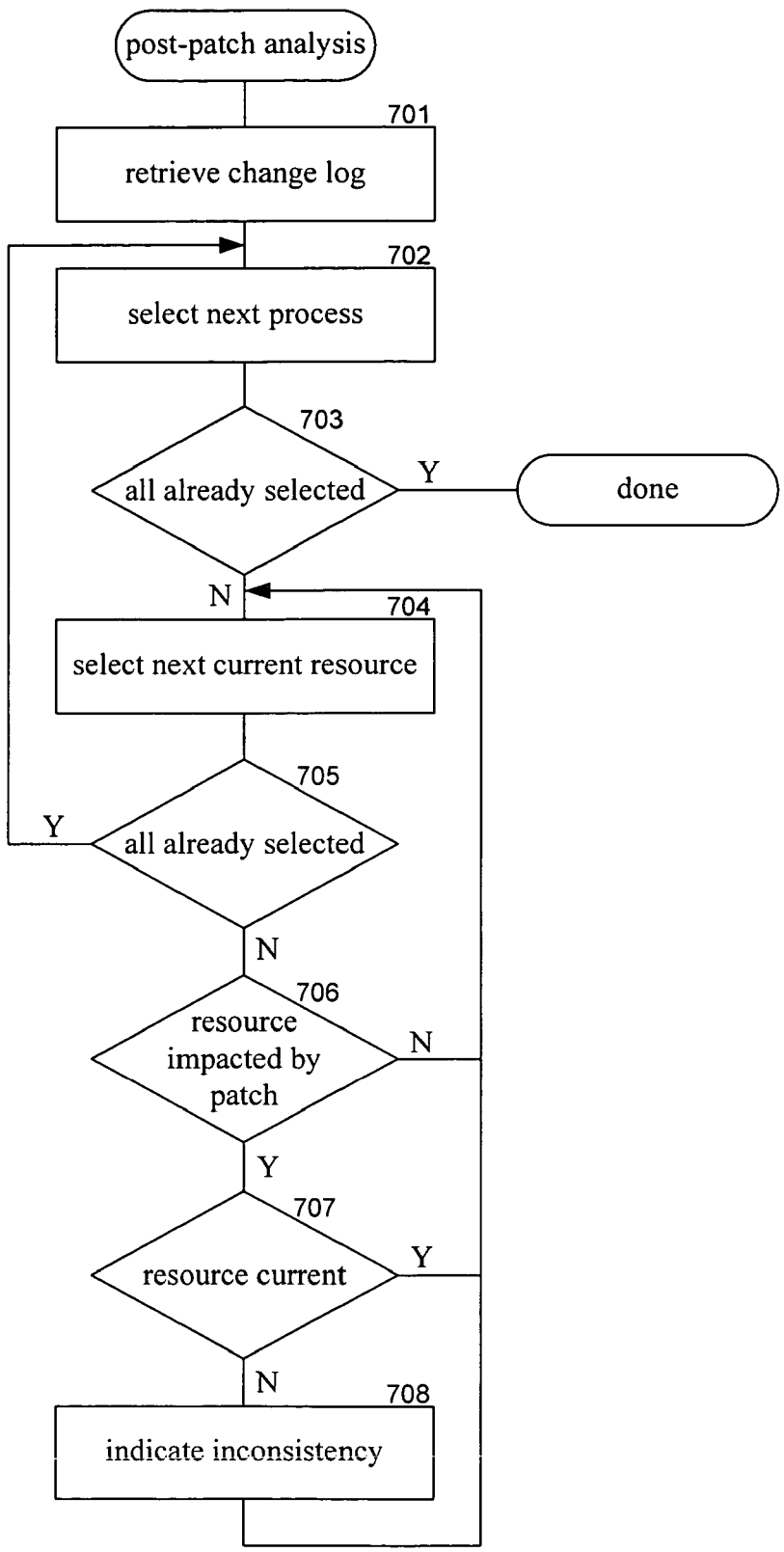
FIG. 7 is a flow diagram that illustrates the processing of the post-patch analysis component in one embodiment.

FIG. 7 is a flow diagram that illustrates the processing of the post-patch analysis component in one embodiment. The component identifies after the installation of a patch whether any applications are using out-of-date resources. In block 701, the component retrieves the change log for the installation of the patch. In blocks 702-708, the component loops selecting each process currently executing on the user computer and determining whether it is using any out-of-date resources. In block 702, the component selects the next process. In decision block 703, if all the processes of the user computer have already been selected, then the component completes, else the component continues at block 704. In block 704, the component selects the next current resource of the selected process. In decision block 705, if all the current resources have already been selected, then the component loops to block 702 to select the next process, else the component continues at block 706. In decision block 706, if the selected resource is affected by the patch, then the resource is impacted by the patch and the component continues at block 707, else the component loops to block 704 to select the next current resource. In decision block 707, if the process is using a version of the resource that is up to date, then the component loops to block 704 to select the next current resource, else the component continues at block 708. In block 708, the component indicates that the resource currently being used is inconsistent with the version of the resource that was installed with the update. The component then loops to block 704 to select the next current resource.

One skilled in the art will appreciate that although specific embodiments of the impact analysis system have been described herein for purposes of illustration, various modifications may be made without deviating from the spirit and scope of the invention. One skilled in the art will appreciate that an update can be any modification to or replacement of modules or resources of a software system, including the installation of a new software system or complete replacement of an existing software system. Accordingly, the invention is not limited except by the appended claims.

We claim:

1. A method in a computing device for determining impact on software components of updates to a software system, the method comprising:

receiving from the developer of the software system a patch for the software system, the patch for updating the software system and providing an identification of resources affected by the update to the software system, the resource identification including a version of the affected resource;

updating the software system by applying the patch to the software system wherein the identified resources are affected by the updating;

after updating the software system,
identifying the software components currently executing on the computing device; and
for each identified software component,
during execution of the software component, identifying by the computing device resources accessed by the software component by tracking accesses of the software component to the resources; and
for each accessed resource that corresponds to an identified affected resource,
determining whether the version of the affected resource is the same as the version of the accessed resource; and
when the version of the affected resource is not the same as a version of the accessed resource, indicating that the identified software component is accessing a version of the accessed resource that is different from the version of the affected resource and thereby accessing an out of date resource.

2. The method of claim 1 wherein a resource is executable code.

3. The method of claim 1 wherein a resource is a registry entry.

4. The method of claim 1 wherein the identifying of the affected resources is based on a change log generated when the update is installed.

5. The method of claim 1 wherein the identifying of the accessed resources includes logging accesses to resources by the software component during execution of the software component.

6. The method of claim 5 wherein the logging occurs across multiple executions of the software component.

7. The method of claim 1 wherein the resources accessed by the software component include a software module loaded into memory.

8. The method of claim 1 wherein the indicating includes providing an indication of frequency at which a resource is accessed by the software component.

9. A computer-readable medium containing instructions for controlling a computer system to determine impact of an update to a software system, by a method comprising:
   receiving an update to the software system, the update identifying resources affected by an update to the software system, the resource identification including a version of the affected resource;
   updating the software system in accordance with the received update wherein the identified resources are affected by the updating; and
   for each software component executing on the computer system after the software system has been updated,
      during the execution of the software component, identifying resources accessed by the software component; and
      for each identified accessed resource,
         determining whether the accessed resource corresponds to an affected resource that is affected by the update; and
         if the accessed resource is an affected resource,
            determining whether the version of the affected resource is the same as the version of the accessed resource; and
            when the version of the affected resource is not the same as a version of the accessed resource, indicating that the software component is accessing a version of the accessed resource that is different from the version of the affected resource and thereby accessing an out of date resource.

10. The computer-readable medium of claim 9 wherein the update is a patch to the software system.

11. The computer-readable medium of claim 9 wherein the identifying of the accessed resources includes logging accesses to resources by the software component during execution of the software component.

12. The computer-readable medium of claim 11 wherein the logging occurs across multiple executions of the software component.

13. The computer-readable medium of claim 9 wherein the resources accessed by the software component include a software module loaded into memory.

14. A method in a computing device for managing installation of updates to software systems, the method comprising:
   installing an update to the software systems, the update including an identification of resources affected by the update, the resource identification including a version of the affected resource;
   identifying software components currently executing on the computing device after the software systems have been updated; and
   for each software component currently executing on the computing device,
   during execution of the software components, logging by the computing device resources accessed by the software components; and
   identifying resources accessed by the software components indicated by the logging that correspond to an affected resource; and
   determining whether the version of the affected resource is the same as the version of the accessed resource; and
   when the version of the affected resource is not the same as a version of the accessed resource, indicating that the software component is accessing a version of the accessed resource that is different from the version of the affected resource and thereby accessing an out of date resource.

15. The method of claim 14 wherein the software system is an operating system and the software components are applications.

16. The method of claim 14 wherein the resources include registry entries.

17. The method of claim 14 wherein the resources include files.

18. The method of claim 14 wherein the resources include other software components with which a software component communicates.

* * * * *

UNITED STATES PATENT AND TRADEMARK OFFICE
CERTIFICATE OF CORRECTION

PATENT NO. : 7,614,046 B2  Page 1 of 1
APPLICATION NO. : 10/997685
DATED : November 3, 2009
INVENTOR(S) : Daniels et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1332 days.

Signed and Sealed this

Fourteenth Day of December, 2010

David J. Kappos
*Director of the United States Patent and Trademark Office*